(12) United States Patent
Liu

(10) Patent No.: US 8,791,676 B2
(45) Date of Patent: Jul. 29, 2014

(54) REFERENCE ADJUSTING POWER SUPPLY FOR PROCESSOR AND CONTROL METHOD THEREOF

(75) Inventor: Chao Liu, Sunnyvale, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 342 days.

(21) Appl. No.: 13/251,090

(22) Filed: Sep. 30, 2011

(65) Prior Publication Data

US 2013/0086396 A1      Apr. 4, 2013

(51) Int. Cl.
*G05F 1/56* (2006.01)
*G05F 1/565* (2006.01)

(52) U.S. Cl.
USPC .......................................... 323/282; 323/311

(58) Field of Classification Search
USPC .......... 323/282–285, 288–290, 311–314, 317
See application file for complete search history.

(56) References Cited

U.S. PATENT DOCUMENTS

| 5,777,461 | A * | 7/1998 | Massie et al. ................. 323/282 |
| 6,894,471 | B2 * | 5/2005 | Corva et al. .................. 323/282 |
| 7,348,812 | B2 * | 3/2008 | Ikezawa ........................ 327/131 |
| 7,573,152 | B2 * | 8/2009 | Jacob et al. ..................... 307/19 |
| 7,728,749 | B2 * | 6/2010 | Sahu .............................. 341/144 |
| 7,863,875 | B1 * | 1/2011 | Guo et al. ..................... 323/275 |
| 7,902,800 | B2 * | 3/2011 | Jain et al. ..................... 323/224 |
| 7,906,948 | B2 * | 3/2011 | Qiu et al. ..................... 323/282 |
| 8,179,111 | B2 * | 5/2012 | Akyildiz et al. .............. 323/283 |
| 8,410,768 | B2 * | 4/2013 | Huber et al. .................. 323/284 |

* cited by examiner

*Primary Examiner* — Adolf Berhane
*Assistant Examiner* — Nusrat Quddus
(74) *Attorney, Agent, or Firm* — Perkins Coie LLP

(57) ABSTRACT

The present invention provides a power supply for processor and control method thereof. The power supply comprises a reference adjusting circuit and a voltage regulator. The reference adjusting circuit is configured to receive a VID code from a processor, and adjust a reference voltage based on the VID code. The voltage regulator is coupled to the reference adjusting circuit and converts an input voltage into an output voltage in accordance to the reference voltage. The reference adjusting circuit adjusts the reference voltage in a plurality of steps until the reference voltage reaches a target value corresponding to the VID code. The reference adjusting circuit adjusts the reference voltage by a preset value during each step, and proceeds to adjust the reference voltage by a next step only after the output voltage reaches a predetermined scope of the reference voltage.

20 Claims, 5 Drawing Sheets

| DEC | VID7 | VID6 | VID5 | VID4 | VID3 | VID2 | VID1 | VID0 | HEX | V$_{OUT}$ |
|---|---|---|---|---|---|---|---|---|---|---|
| 0 | 0 | 0 | 0 | 0 | 0 | 0 | 0 | 0 | 00 | OFF |
| 1 | 0 | 0 | 0 | 0 | 0 | 0 | 0 | 1 | 01 | 0.500 |
| 2 | 0 | 0 | 0 | 0 | 0 | 0 | 1 | 0 | 02 | 0.510 |
| 3 | 0 | 0 | 0 | 0 | 0 | 0 | 1 | 1 | 03 | 0.520 |
| 4 | 0 | 0 | 0 | 0 | 0 | 1 | 0 | 0 | 04 | 0.530 |
| 5 | 0 | 0 | 0 | 0 | 0 | 1 | 0 | 1 | 05 | 0.540 |
| 6 | 0 | 0 | 0 | 0 | 0 | 1 | 1 | 0 | 06 | 0.550 |
| 7 | 0 | 0 | 0 | 0 | 0 | 1 | 1 | 1 | 07 | 0.560 |
| 8 | 0 | 0 | 0 | 0 | 1 | 0 | 0 | 0 | 08 | 0.570 |
| 9 | 0 | 0 | 0 | 0 | 1 | 0 | 0 | 1 | 09 | 0.580 |
| 10 | 0 | 0 | 0 | 0 | 1 | 0 | 1 | 0 | 0A | 0.590 |
| 11 | 0 | 0 | 0 | 0 | 1 | 0 | 1 | 1 | 0B | 0.600 |
| 12 | 0 | 0 | 0 | 0 | 1 | 1 | 0 | 0 | 0C | 0.610 |
| 13 | 0 | 0 | 0 | 0 | 1 | 1 | 0 | 1 | 0D | 0.620 |
| 14 | 0 | 0 | 0 | 0 | 1 | 1 | 1 | 0 | 0E | 0.630 |
| 15 | 0 | 0 | 0 | 0 | 1 | 1 | 1 | 1 | 0F | 0.640 |
| 16 | 0 | 0 | 0 | 1 | 0 | 0 | 0 | 0 | 10 | 0.650 |
| 17 | 0 | 0 | 0 | 1 | 0 | 0 | 0 | 1 | 11 | 0.660 |
| 18 | 0 | 0 | 0 | 1 | 0 | 0 | 1 | 0 | 12 | 0.670 |
| 19 | 0 | 0 | 0 | 1 | 0 | 0 | 1 | 1 | 13 | 0.680 |
| 20 | 0 | 0 | 0 | 1 | 0 | 1 | 0 | 0 | 14 | 0.690 |
| 21 | 0 | 0 | 0 | 1 | 0 | 1 | 0 | 1 | 15 | 0.700 |
| 22 | 0 | 0 | 0 | 1 | 0 | 1 | 1 | 0 | 16 | 0.710 |
| 23 | 0 | 0 | 0 | 1 | 0 | 1 | 1 | 1 | 17 | 0.720 |
| 24 | 0 | 0 | 0 | 1 | 1 | 0 | 0 | 0 | 18 | 0.730 |
| 25 | 0 | 0 | 0 | 1 | 1 | 0 | 0 | 1 | 19 | 0.740 |
| 26 | 0 | 0 | 0 | 1 | 1 | 0 | 1 | 0 | 1A | 0.750 |
| 27 | 0 | 0 | 0 | 1 | 1 | 0 | 1 | 1 | 1B | 0.760 |
| 28 | 0 | 0 | 0 | 1 | 1 | 1 | 0 | 0 | 1C | 0.770 |
| 29 | 0 | 0 | 0 | 1 | 1 | 1 | 0 | 1 | 1D | 0.780 |
| 30 | 0 | 0 | 0 | 1 | 1 | 1 | 1 | 0 | 1E | 0.790 |
| ... | | | | | | | | | | |
| 241 | 1 | 1 | 1 | 1 | 0 | 0 | 0 | 1 | F1 | 2.900 |
| 242 | 1 | 1 | 1 | 1 | 0 | 0 | 1 | 0 | F2 | 2.910 |
| 243 | 1 | 1 | 1 | 1 | 0 | 0 | 1 | 1 | F3 | 2.920 |
| 244 | 1 | 1 | 1 | 1 | 0 | 1 | 0 | 0 | F4 | 2.930 |
| 245 | 1 | 1 | 1 | 1 | 0 | 1 | 0 | 1 | F5 | 2.940 |
| 246 | 1 | 1 | 1 | 1 | 0 | 1 | 1 | 0 | F6 | 2.950 |
| 247 | 1 | 1 | 1 | 1 | 0 | 1 | 1 | 1 | F7 | 2.960 |
| 248 | 1 | 1 | 1 | 1 | 1 | 0 | 0 | 0 | F8 | 2.970 |
| 249 | 1 | 1 | 1 | 1 | 1 | 0 | 0 | 1 | F9 | 2.980 |
| 250 | 1 | 1 | 1 | 1 | 1 | 0 | 1 | 0 | FA | 2.990 |
| 251 | 1 | 1 | 1 | 1 | 1 | 0 | 1 | 1 | FB | 3.000 |
| 252 | 1 | 1 | 1 | 1 | 1 | 1 | 0 | 0 | FC | 3.010 |
| 253 | 1 | 1 | 1 | 1 | 1 | 1 | 0 | 1 | FD | 3.020 |
| 254 | 1 | 1 | 1 | 1 | 1 | 1 | 1 | 0 | FE | 3.030 |
| 255 | 1 | 1 | 1 | 1 | 1 | 1 | 1 | 1 | FF | 3.040 |

*Fig. 6*

REFERENCE ADJUSTING POWER SUPPLY FOR PROCESSOR AND CONTROL METHOD THEREOF

TECHNICAL FIELD

Embodiments of the present invention generally relates to power supplies, and more particularly, relates to power supplies for processors and control methods thereof.

BACKGROUND

In a computer system, the operating voltage supplied to the processor, such as the central process unit (CPU) or graphic process unit (GPU), is determined by a dynamic voltage identification (VID) code produced based on the requirement of the processor.

FIG. 1 is a block diagram of a prior power supply. A VID code is generated by a processor 103 in accordance to its required operating voltage. A reference adjusting circuit 101 receives the VID code, and based on the VID code, adjusts a previously set reference voltage $V_{refint}$, and outputs the adjusted reference voltage $V_{ref}$.

A voltage regulator 102 comprising at least one switch receives the adjusted reference voltage $V_{ref}$, and converts an input voltage $V_{in}$ into an output voltage $V_{out}$ in accordance to the adjusted reference voltage $V_{ref}$. The output voltage $V_{out}$ is used as the operating voltage of the processor 103. Generally, the output voltage $V_{out}$ is fed back and compared with the adjusted reference voltage $V_{ref}$, so as to control the ON and OFF switching of the switches in the voltage regulator 102.

In some applications, the reference adjusting circuit 101 further receives a slew rate command together with the VID code from the processor 103. The slew rate command is used to indicate the required transition rate of the operating voltage. In the voltage regulation standard, VR12, set by Intel, there are 3 different slew rates: fast, slow, and decay.

When a slew rate command SetVID_Fast or SetVID_Slow and a VID code are received, the reference adjusting circuit 102 ramps up/down the previously set reference voltage $V_{refint}$ in a controlled rate until the adjusted reference voltage $V_{ref}$ reaches a target value corresponding to the VID code. The target value may be equal to the required operating voltage.

The decay slew rate command SetVID_Decay is normally used for VID down transition. In the prior art, when a SetVID_Decay command and a VID code are received, the reference adjusting circuit 102 directly changes the previously set reference voltage $V_{refint}$ into a target value corresponding to the VID code without controlling the slew rate. The switches in the voltage regulator 102 will all be shut down and the output voltage $V_{out}$ decays at a rate proportional to the load current.

However, if the processor 103 sends out a SetVID_Fast or SetVID_Slow command with a new VID code before the output voltage $V_{out}$ decays to reach the previously set reference voltage $V_{refint}$, the switches in the voltage regulator 102 will be activated again. The reference adjusting circuit 102 will ramp up/down the previously set reference voltage $V_{refint}$ in a controlled rate. If the output voltage $V_{out}$ is much bigger than the adjusted reference voltage $V_{ref}$ at the time, an undershoot of the output voltage $V_{out}$ will be generated and the switches in the voltage regulator 102 may be damaged if there is no reverse current protection for the switches.

FIG. 2 is a waveform of the prior power supply shown in FIG. 1. At t=t0, the reference voltage $V_{ref}$ is $V_{REF0}$ and the output voltage $V_{out}$ is equal to the reference voltage $V_{ref}$. At t=t1, a SetVID_Decay command and a first VID code VID1 are sent to the reference adjusting circuit 101 by the processor 103. The reference voltage $V_{ref}$ is directly changed into a first target value $V_{REF1}$ corresponding to VID1. The switches in the voltage regulator 102 are all shut down and the output voltage $V_{out}$ decays at a rate proportional to the load current.

At t=t2, a SetVID_Fast command and a second VID code VID2 are sent to the reference adjusting circuit 101, wherein VID2 is larger than VID1. The switches in the voltage regulator 102 are activated again and the reference voltage $V_{ref}$ is ramped up in a controlled rate. Since the output voltage $V_{out}$ is much bigger than the reference voltage $V_{ref}$ at t=t2, an undershoot of the output voltage $V_{out}$ is generated. The output voltage $V_{out}$ is increased along with the reference voltage $V_{ref}$ after then. At t=t3, the reference voltage $V_{ref}$ and the output voltage $V_{out}$ reach a second target value $V_{REF2}$ corresponding to VID2.

SUMMARY

The present invention is directed to a power supply for processor and control method thereof. In an embodiment of the present disclosure, the power supply comprises a reference adjusting circuit and a voltage regulator. The reference adjusting circuit is configured to receive a VID code from a processor, and adjust a reference voltage based on the VID code. The voltage regulator is coupled to the reference adjusting circuit and converts an input voltage into an output voltage in accordance to the reference voltage. The reference adjusting circuit adjusts the reference voltage in a plurality of steps until the reference voltage reaches a target value corresponding to the VID code. The reference adjusting circuit adjusts the reference voltage by a preset value during each of the plurality of steps, and proceeds to adjust the reference voltage by a next step of the plurality of steps only after the output voltage reaches a predetermined scope of the reference voltage. In one embodiment, the reference adjusting circuit adjusts the reference voltage by reducing it.

BRIEF DESCRIPTION OF THE DRAWING

The present invention can be further understood with reference to the following detailed description and the appended drawings, wherein like elements are provided with like reference numerals.

FIG. 6 is a table illustrating a dynamic VID code corresponding to a required output voltage, in accordance with one embodiment of the present disclosure.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

A power supply comprising a reference adjusting circuit and a voltage regulator is disclosed. The reference adjusting circuit receives a VID code from a processor, and adjusts a reference voltage based on the VID code. The voltage regulator is coupled to the reference adjusting circuit, and converts an input voltage into an output voltage in accordance to the reference voltage. The reference adjusting circuit adjusts the reference voltage in a plurality of steps until the reference voltage reaches a target value corresponding to the VID code. The reference adjusting circuit adjusts the reference voltage by a preset value during each of the plurality of steps, and proceeds to adjust the reference voltage by a next step of the plurality of steps only after the output voltage reaches a predetermined scope of the reference voltage.

Figure 1:
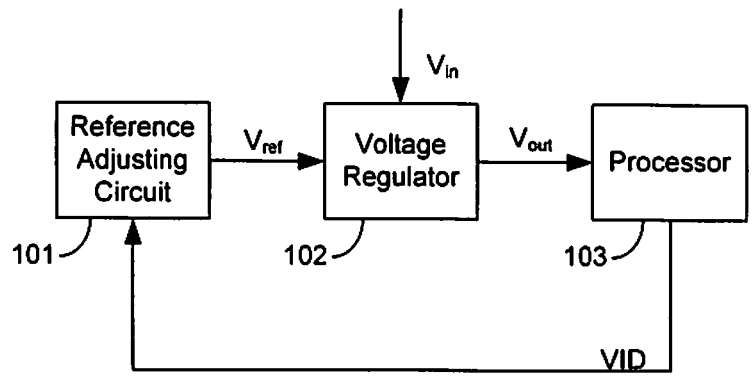
FIG. 1 is a block diagram of a prior power supply.
Figure 2:
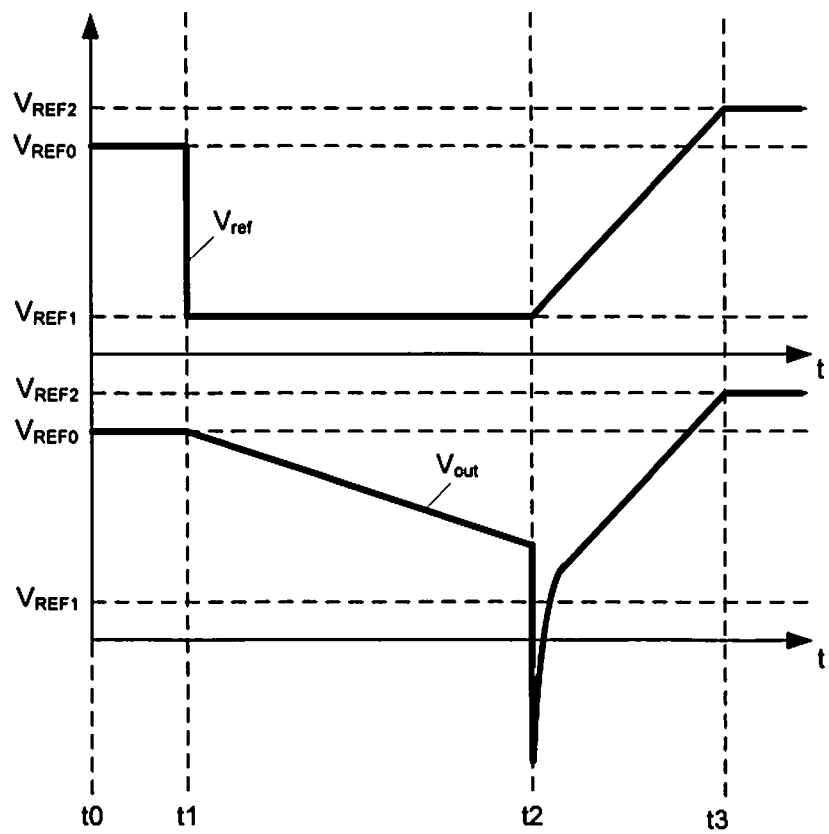
FIG. 2 is a waveform of the power supply shown in FIG. 1.
Figure 3:
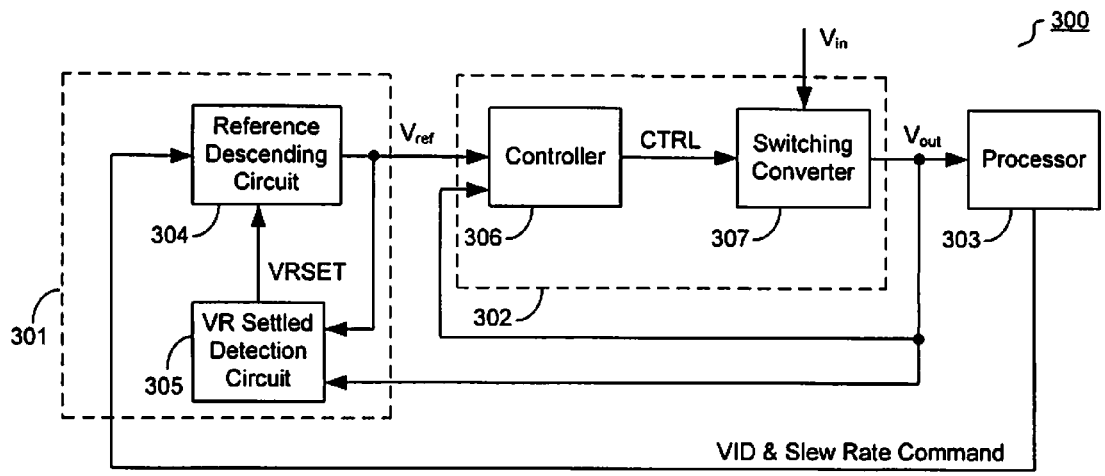
FIG. 3 is a block diagram of a power supply, in accordance with an embodiment of the present disclosure.

FIG. 3 is a block diagram of a power supply 300, in accordance with an embodiment of the present disclosure. The power supply 300 comprises a reference adjusting circuit 301 and a voltage regulator 302. The reference adjusting circuit 301 receives the VID code from a processor 303, and adjusts a reference voltage $V_{ref}$ based on the VID code. The reference adjusting circuit 301 may receive the VID code through serial or parallel communication. The processor 303 may be CPU, GPU or other signal processors. In one embodiment, the reference adjusting circuit 301 receives the VID code through a Serial VID bus which is a three wire (clock, data, alert) serial source synchronous interface used to transfer power management information.

The voltage regulator 302 is coupled to the reference adjusting circuit 301, and converts an input voltage $V_{in}$ into an output voltage $V_{out}$ in accordance to the reference voltage $V_{ref}$. In one embodiment, an offset value is added to the VID code to form a modified VID code. The voltage regulator 302 converts the input voltage $V_{in}$ into the output voltage $V_{out}$ in accordance to the modified VID code.

The reference adjusting circuit 302 adjusts the reference voltage $V_{ref}$ in a plurality of steps until the reference voltage $V_{ref}$ reaches a target value corresponding to the VID code. The reference adjusting circuit 302 adjusts the reference voltage $V_{ref}$ by a preset value during each of the plurality of steps, and proceeds to adjust the reference voltage $V_{ref}$ by a next step of the plurality of steps only after the output voltage $V_{out}$ reaches a predetermined scope of the reference voltage $V_{ref}$.

In one embodiment, the reference adjusting circuit 302 adjusts the reference voltage $V_{ref}$ by reducing it. The reference adjusting circuit 302 reduces the reference voltage step by step (for example, N steps in total, N ≥ 2) until the reference voltage $V_{ref}$ reaches a target value corresponding to the VID code. The reference adjusting circuit 302 reduces the reference voltage $V_{ref}$ by a preset value $V_{pre\_i}$ during each step, and proceeds to the next step only after the output voltage $V_{out}$ reaches a predetermined scope of the reference voltage $V_{ref}$, wherein i=1, 2, . . . , N. In one embodiment, the preset value of each step, $V_{pre\_1}, V_{pre\_2}, \ldots, V_{pre\_N}$, may be unequal. In another embodiment, these preset values may be equal to $V_{pre}$.

In one embodiment, the VID code is generated by the processor 303 in accordance to its required operating voltage. The processor 303 is coupled to the voltage regulator 302 to receive the output voltage $V_{out}$. In another embodiment, the VID code is generated by the processor 303 in accordance to the requirement of a load. The load, instead of the processor 303, is coupled to the voltage regulator 302 to receive the output voltage $V_{out}$.

In one embodiment, the reference adjusting circuit 301 comprises a reference descending circuit 304 and a voltage regulation settled detection circuit 305. The voltage regulation settled detection circuit 305 is coupled to the voltage regulator 302 and generates a voltage regulation settled signal VRSET when the output voltage $V_{out}$ reaches a predetermined scope of the reference voltage $V_{ref}$. The reference descending circuit 304 is coupled to the voltage regulation settled detection circuit 305, adjusts the reference voltage $V_{ref}$ in the plurality of steps based on the voltage regulation settled signal VRSET, until the reference voltage $V_{ref}$ reaches the target value.

In one embodiment, the voltage regulator 302 comprises a controller 306 and a switching converter 307. The switching converter 307 comprises at least one switch, converts the input voltage $V_{in}$ into the output voltage $V_{out}$ through the ON and OFF switching of the at least one switch. The controller 306 is coupled to the reference adjusting circuit 301, generates a control signal CTRL to control the ON and OFF of the at least one switch in accordance to the reference voltage $V_{ref}$. The controller 306 may be a PWM controller or PFM controller. The switching converter 307 may be configured in any AC/DC topology or DC/DC topology. In one embodiment, the output voltage $V_{out}$ is fed back to adjust the control signal CTRL. In another embodiment, both the load current and the output voltage $V_{out}$ are fed back to adjust the control signal CTRL. In one embodiment, the reference adjusting circuit 301 and the controller 306 are integrated in an IC.

In one embodiment, the target value corresponding to the VID code is equal to the required output voltage. The output voltage $V_{out}$ is compared with a thresholds $V_{th1}$ related to the reference voltage $V_{ref}$. The output voltage $V_{out}$ is deemed as reaching the predetermined scope of the reference voltage $V_{ref}$ if the output voltage $V_{out}$ is smaller than the threshold $V_{th1}$. In another embodiment, the output voltage $V_{out}$ is compared with thresholds $V_{th1}$ and $V_{th2}$ which are related to the reference voltage $V_{ref}$, wherein the threshold $V_{th1}$ is larger than the threshold $V_{th2}$. The output voltage $V_{out}$ is deemed as reaching the predetermined scope of the reference voltage $V_{ref}$ if the output voltage $V_{out}$ is larger than the threshold $V_{th2}$ and smaller than the threshold $V_{th1}$. In one embodiment, the threshold $V_{th1}$ is a sum of the reference voltage $V_{ref}$ and a settle value $V_{settle}$ ($V_{th1} = V_{ref} + V_{settle}$), and the threshold $V_{th2}$ is a difference between the reference voltage $V_{ref}$ and the settle value $V_{settle}$ ($V_{th2} = V_{ref} - V_{settle}$). In one embodiment, the settle value $V_{settle}$ is 10 mV.

In one embodiment, the output voltage $V_{out}$ is sensed and an output sensing signal is generated accordingly. The output sensing signal is fed back to adjust the control signal CTRL, and compared with the thresholds above to detect whether the output voltage $V_{out}$ reaches the predetermined scope of the reference voltage $V_{ref}$.

In one embodiment, the reference adjusting circuit 301 further receives a slew rate command from the processor 303. When a first slew rate command, such as SetVID_Decay, is received together with the VID code, the reference adjusting circuit 301 reduces the reference voltage $V_{ref}$ step by step until the reference voltage $V_{ref}$ reaches the target value corresponding to the VID code. The reference adjusting circuit 301 reduces the reference voltage $V_{ref}$ by a preset value $V_{pre\_i}$ during each step, and proceeds to the next step after the output voltage $V_{out}$ reaches a predetermined scope of the reference voltage $V_{ref}$. When a second slew rate command, such as SetVID_Fast or SetVID_Slow, is received together with the VID code, the reference adjusting circuit 301 ramps up/down the reference voltage $V_{ref}$ in a controlled rate until the reference voltage $V_{ref}$ reaches the target value corresponding to the VID code.

Figure 4:
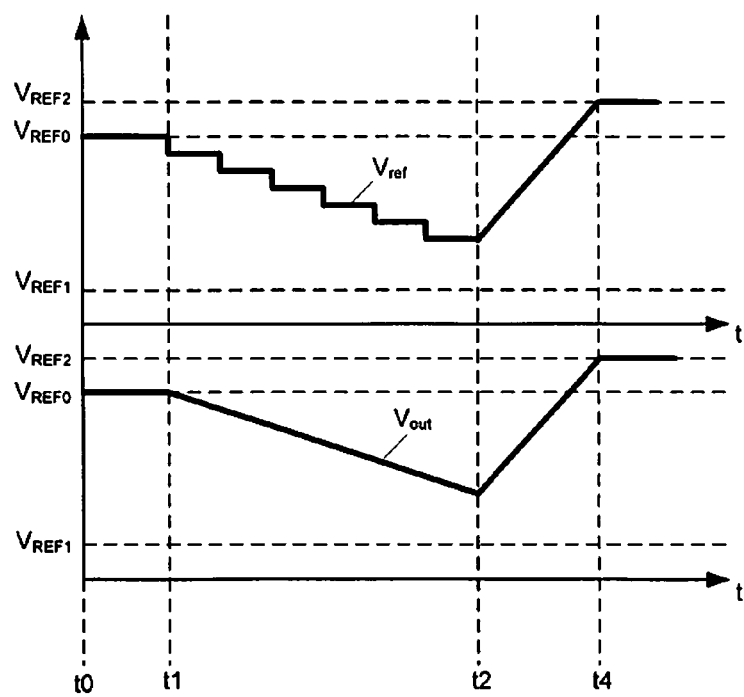
FIG. 4 is a waveform of the power supply shown in FIG. 3, in accordance with an embodiment of the present disclosure.

FIG. 4 is a waveform of the power supply shown in FIG. 3, in accordance with an embodiment of the present disclosure. At t=t0, the reference voltage $V_{ref}$ is $V_{REF0}$ the output voltage $V_{out}$ is equal to the reference voltage $V_{ref}$. At t=t1, a SetVID_Decay command and a first VID code VID1 are sent to the reference adjusting circuit 301. The switches in the switching converter 307 are all shut down and the output voltage $V_{out}$ decays at a rate proportional to the load current. The reference voltage $V_{ref}$ is reduced step by step. The reference voltage $V_{ref}$ is reduced by a preset value $V_{pre}$ during each step, and the next step is triggered only after the output voltage $V_{out}$ reaches a predetermined scope of the reference voltage $V_{ref}$ ($V_{ref}-V_{settle} \leq V_{out} \leq V_{ref}+V_{settle}$).

At t=t2, a SetVID_Fast command and a second VID code VID2 are sent to the reference adjusting circuit 301, wherein VID2 is larger than VID1. The switches in the switching converter 307 are activated again and the reference voltage $V_{ref}$ is ramped up in a controlled rate. Since the output voltage $V_{out}$ is not far away from the reference voltage $V_{ref}$ at t=t2 (the difference is at most $V_{pre}+V_{settle}$), the output voltage $V_{out}$ will increase along with the reference voltage $V_{ref}$ without any undershoot. At t=t4, the reference voltage $V_{ref}$ and the output voltage $V_{out}$ reach the second target value $V_{REF2}$ corresponding to VID2.

Since the output voltage $V_{out}$ is kept around the reference voltage $V_{ref}$ during the decay transition, the large reverse current and the undershoot of the output voltage $V_{out}$ are eliminated. The time used to achieve the second target value $V_{REF2}$ is also shortened.

Figure 5:
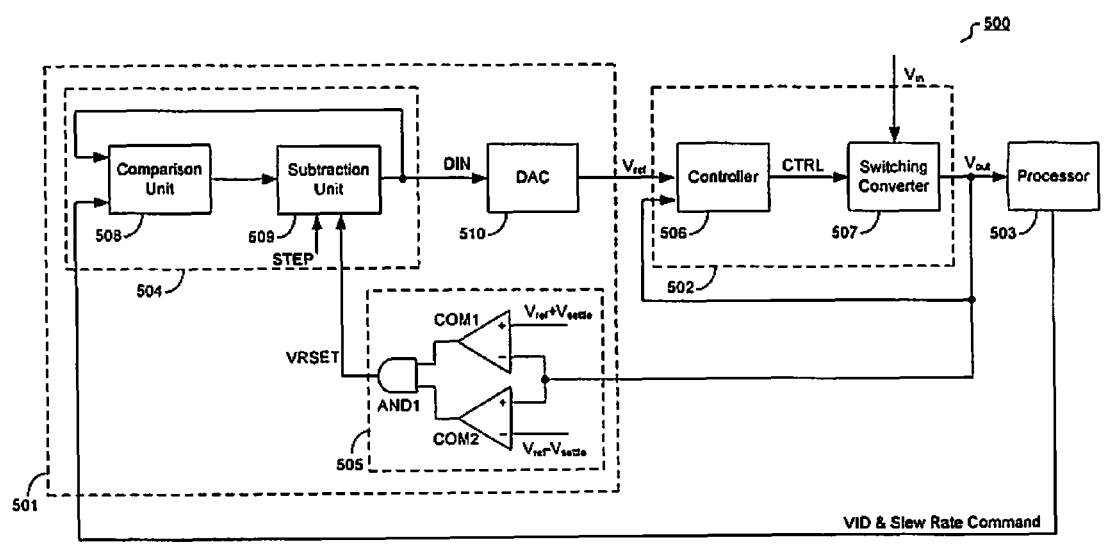
FIG. 5 is a block diagram of a power supply, in accordance with an embodiment of the present disclosure.

FIG. 5 is a block diagram of a power supply 500, in accordance with an embodiment of the present disclosure. The power supply 500 comprises a reference adjusting circuit 501 and a voltage regulator 502. The voltage regulator 302 converts an input voltage $V_{in}$ into an output voltage $V_{out}$ in accordance to a reference voltage $V_{ref}$. The reference adjusting circuit 501 receives a VID code from a processor 503, and adjusts the reference voltage $V_{ref}$ based on the VID code.

The reference adjusting circuit 501 comprises a reference descending circuit 504, a voltage regulation settled detection circuit 505 and a digital to analog converter 510. The digital to analog converter 510 converts a digital input signal DIN into the reference voltage $V_{ref}$. The voltage regulation settled detection circuit 505 is coupled to the voltage regulator 502, and generates a voltage regulation settled signal VRSET when the output voltage $V_{out}$ reaches a predetermined scope of the reference voltage $V_{ref}$. The reference descending circuit 504 is coupled to the voltage regulation settled detection circuit 505 and the digital to analog converter 510, adjust the digital input signal DIN in the plurality of steps based on the voltage regulation settled signal VRSET, until the digital input signal DIN becomes equal to the VID code.

In one embodiment, the reference descending circuit 502 reduces the digital input signal DIN by a step value STEP during each step, and proceeds to the next step only after the output voltage $V_{out}$ reaches a predetermined scope of the reference voltage $V_{ref}$. In one embodiment, the step value STEP is 1 LSB (least significant bit). In one embodiment, the reference descending circuit 504 is a microprocessor which executes a program to realize the actions above.

In one embodiment, the reference descending circuit 504 comprises a comparison unit 508 and a subtraction unit 509. The comparison unit 508 compares the digital input signal DIN with the VID code. The subtraction unit 509 is coupled the comparison unit 508, the voltage regulation settled detection circuit 505 and the digital to analog converter 510, subtracts the step value STEP from the digital input signal DIN based on the voltage regulation settled signal VRSET and the comparison result of the comparison unit 508.

In one embodiment, the voltage regulation settled detection circuit 505 comprises an AND gate AND1, comparators COM1 and COM2. The non-inverting input terminal of the comparator COM1 receives the first threshold $V_{th1}$ ($V_{th1}=V_{ref}+V_{settle}$). The inverting input terminal of the comparator COM1 and the non-inverting input terminal of the comparator COM2 are coupled to the output terminal of the switching converter 510 to receive the output voltage $V_{out}$. The inverting input terminal of the comparator COM2 receives the second threshold $V_{th2}$ ($V_{th2}=V_{ref}-V_{settle}$). The two input terminals of the AND gate AND1 are coupled to the output terminals of the comparators COM1 and COM2 separately. The output terminal of the AND gate AND1 provides the voltage regulation settled signal VRSET.

In one embodiment, the reference adjusting circuit 501 further receives a slew rate command from the processor 503. When a SetVID_Decay Command and a VID code are received, the reference adjusting circuit 501 reduces the digital input signal DIN by only 1 LSB instead of changing it immediately into the VID code. The reference adjusting circuit 501 waits until the output voltage $V_{out}$ settles (reaches a predetermined scope of the reference voltage $V_{ref}$), and reduces another 1 LSB. The reference adjusting circuit 501 keeps doing this until the digital input signal DIN reaches the VID code. By doing this, the output voltage $V_{out}$ tracks the reference voltage $V_{ref}$ with a small error throughout the decay operation. This ensures that the output voltage $V_{out}$ is ready to ramp to the next required output voltage without discharging the output at the start of the new ramp, even if a new slew rate command (SetVID_Fast or SetVID_Slow) is received during the decay operation.

FIG. 6 is a table illustrating a dynamic VID code corresponding to a required output voltage, in accordance with one embodiment of the present disclosure. The VID code and the digital input signal DIN are 8-bit signals. Given the previous digital input signal DIN is 0F1H (11110001B) and the previous output voltage $V_{out}$ is 2.9V, if a VID code 15H (00010101B) and a SetVID_Decay command are received from the processor 503, the digital input signal DIN will be decreased from 0F1H to 15H step by step. The output voltage $V_{out}$ will decay from 2.9V to 0.7V at a rate proportional to the load current. In one embodiment, the step value STEP is 01H (00000001B) and the settle value $V_{settle}$ is 10 mV. During each step, the digital input signal DIN is reduced by 01H. The next step is triggered only after the output voltage $V_{out}$ reaches ±10 mV of the reference voltage $V_{ref}$.

If a SetVID_Fast or SetVID_Slow command is received together with a new VID code, such as 0FBH (11111011B), during the decay operation, the digital input signal DIN will be changed into the new VID code in a controlled rate.

A control method of a power supply is also disclosed. The power supply comprises a voltage regulator which converts an input voltage into an output voltage in accordance to a reference voltage. The control method comprising: receiving a VID code indicative of the required output voltage from a processor, and adjusting the reference voltage in a plurality of steps until the reference voltage reaches a target value corresponding to the VID code. The reference voltage is adjusted by a preset value during each of the plurality of steps, and the reference voltage is adjusted by a next step of the plurality of steps only after the output voltage reaches a predetermined scope of the reference voltage.

Figure 7:
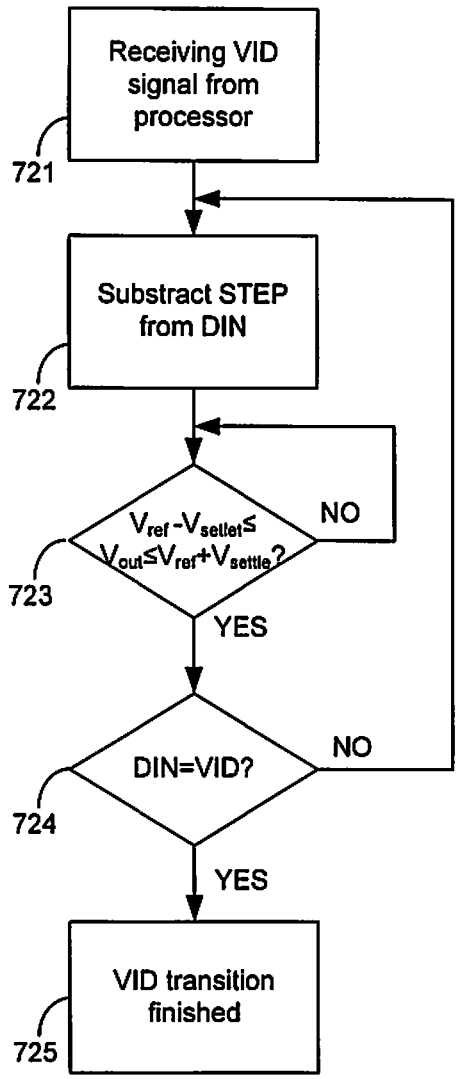
FIG. 7 is a flow chart of a control method of power supply, in accordance with an embodiment of the present disclosure.

FIG. 7 is a flow chart of a control method of power supply, in accordance with an embodiment of the present disclosure. The power supply comprises a voltage regulator which converts an input voltage $V_{in}$ into an output voltage $V_{out}$ in accordance to a reference voltage $V_{ref}$. The reference voltage $V_{ref}$ is generated by a digital to analog converter in accordance to a digital input signal DIN. The control method comprises steps 721~726.

At Step 721, a VID code indicative of the required output voltage is received from a processor.

At Step 722, a step value STEP is subtracted from the digital input signal DIN.

At Step 723, whether the output voltage reaches a predetermined scope of the reference voltage is detected. If yes, go to Step 724, else, keep detecting. In one embodiment, the output voltage is compared with a first threshold voltage and a second threshold voltage, wherein the first threshold voltage is larger then the second threshold voltage. The output voltage is deemed as reaching the predetermined scope of the reference voltage if the output voltage is larger than the second threshold voltage and smaller than the first threshold voltage. In one embodiment, the first threshold voltage is a sum of the reference voltage and a settle value voltage, and the second threshold voltage is a difference between the reference voltage and the settle value voltage At Step 724, the digital input signal DIN is compared with the VID code. If the digital input signal DIN is equal to the VID code, go to Step 725, else, go to Step 722.

At Step 725, the VID transition is finished.

In one embodiment, the control method further comprises: receiving a slew rate command from the processor; when a first slew rate command is received together with a first VID code, reducing the reference voltage step by step until the reference voltage reaches a first target value corresponding to the first VID code; and when a second slew rate command is received together with a second VID code, changing the reference voltage into a second target value corresponding to the second VID code in a controlled rate.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A power supply, comprising:
    a reference adjusting circuit configured to receive a VID code from a processor, and based on the VID code, a reference voltage is adjusted by the reference adjusting circuit; and
    a voltage regulator coupled to the reference adjusting circuit, wherein the voltage regulator converts an input voltage into an output voltage in accordance to the reference voltage; wherein
    the reference adjusting circuit adjusts the reference voltage in a plurality of steps until the reference voltage reaches a target value corresponding to the VID code, and wherein the reference adjusting circuit adjusts the reference voltage by a preset value during each of the plurality of steps, and the reference adjusting circuit is configured to proceed to adjust the reference voltage by a next step of the plurality of steps only after the output voltage reaches a predetermined scope of the reference voltage.

2. The power supply of claim 1, wherein the reference adjusting circuit adjusts the reference voltage by reducing it.

3. The power supply of claim 1, wherein the reference adjusting circuit comprises:
    a voltage regulation settled detection circuit coupled to the voltage regulator, wherein the voltage regulation settled detection circuit is configured to generate a voltage regulation settled signal when the output voltage reaches a predetermined scope of the reference voltage; and
    a reference descending circuit coupled to the voltage regulation settled detection circuit, wherein the reference descending circuit is configured, based on the voltage regulation settled signal, to adjust the reference voltage in the plurality of steps until the reference voltage reaches the target value.

4. The power supply of claim 3, wherein the reference adjusting circuit further comprises:
    a digital to analog converter configured to convert a digital input signal into the reference voltage; wherein
    the reference descending circuit is coupled to the digital to analog converter, and the reference descending circuit is configured to adjust the digital input signal in the plurality of steps based on the voltage regulation settled signal until the digital input signal becomes equal to the VID code.

5. The power supply of claim 1, wherein the output voltage is compared with a first threshold voltage and a second threshold voltage, wherein the output voltage is deemed as reaching the predetermined scope of the reference voltage if the output voltage is larger than the second threshold voltage and smaller than the first threshold voltage, wherein the first threshold voltage is larger than the second threshold voltage.

6. The power supply of claim 5, wherein the first threshold voltage is a sum of the reference voltage and a settle value voltage, and the second threshold voltage is a difference between the reference voltage and the settle value voltage.

7. The power supply of claim 1, wherein the voltage regulator comprises:
    a switching converter, having at least one switch, wherein the switching converter is configured to convert the input voltage into the output voltage through the ON and OFF switching of the at least one switch; and
    a controller coupled to the reference adjusting circuit, wherein the controller is configured to generate a control signal to control the ON and OFF of the at least one switch in accordance to the reference voltage.

8. The power supply of claim 1, wherein the reference adjusting circuit further receives a slew rate command from the processor, when a first slew rate command is received together with the VID code, the reference adjusting circuit reduces the reference voltage step by step until the reference voltage reaches the target value corresponding to the VID code; when a second slew rate command is received together with the VID code, the reference adjusting circuit changes the reference voltage into the target value in a controlled rate.

9. A reference adjusting circuit, configured to receive a VID code from a processor, and based on the VID code, a reference voltage of a voltage regulator is adjusted by the reference adjusting circuit, wherein
the reference adjusting circuit adjusts the reference voltage in a plurality of steps until the reference voltage reaches a target value corresponding to the VID code, and wherein the reference adjusting circuit adjusts the reference voltage by a preset value during each of the plurality of steps, and the reference adjusting circuit is configured to proceed to adjust the reference voltage by a next step of the plurality of steps only after the output voltage of the voltage regulator reaches a predetermined scope of the reference voltage.

10. The reference adjusting circuit of claim 9, wherein the reference adjusting circuit adjusts the reference voltage by reducing it.

11. The reference adjusting circuit of claim 9, comprising:
a voltage regulation settled detection circuit coupled to the voltage regulator, wherein the voltage regulation settled detection circuit is configured to generate a voltage regulation settled signal when the output voltage reaches a predetermined scope of the reference voltage; and
a reference descending circuit coupled to the voltage regulation settled detection circuit, wherein the reference descending circuit is configured, based on the voltage regulation settled signal, to adjust the reference voltage in the plurality of steps until the reference voltage reaches the target value.

12. The reference adjusting circuit of claim 11, further comprising:
a digital to analog converter configured to convert a digital input signal into the reference voltage; wherein
the reference descending circuit is coupled to the digital to analog converter, and the reference descending circuit is configured to adjust the digital input signal in the plurality of steps based on the voltage regulation settled signal until the digital input signal becomes equal to the VID code.

13. The reference adjusting circuit of claim 9, wherein the output voltage is compared with a first threshold voltage and a second threshold voltage, wherein the output voltage is deemed as reaching the predetermined scope of the reference voltage if the output voltage is larger than the second threshold voltage and smaller than the first threshold voltage, wherein the first threshold voltage is larger than the second threshold voltage.

14. The reference adjusting circuit of claim 13, wherein the first threshold voltage is a sum of the reference voltage and a settle value voltage, and the second threshold voltage is a difference between the reference voltage and the settle value voltage.

15. The reference adjusting circuit of claim 9, further receiving a slew rate command from the processor, wherein
when a first slew rate command is received together with the VID code, the reference adjusting circuit reduces the reference voltage step by step until the reference voltage reaches the target value corresponding to the VID code; and
when a second slew rate command is received together with the VID code, the reference adjusting circuit changes the reference voltage into the target value in a controlled rate.

16. A control method used in a power supply, wherein the power supply comprises a voltage regulator which converts an input voltage into an output voltage in accordance to a reference voltage, the control method comprising:
receiving a VID code from a processor;
adjusting the reference voltage in a plurality of steps until the reference voltage reaches a target value corresponding to the VID code; wherein
the reference voltage is adjusted by a preset value during each of the plurality of steps, and the reference voltage is adjusted by a next step of the plurality of steps only after the output voltage reaches a predetermined scope of the reference voltage.

17. The control method of claim 16, wherein the reference voltage is generated by a digital to analog converter in accordance to a digital input signal, the control method further comprising:
adjusting the digital input signal in the plurality of steps until the digital input signal becomes equal to the VID code.

18. The control method of claim 16, wherein the output voltage is compared with a first threshold voltage and a second threshold voltage, wherein the output voltage is deemed as reaching the predetermined scope of the reference voltage if the output voltage is larger than the second threshold voltage and smaller than the first threshold voltage, wherein the first threshold voltage is larger then the second threshold voltage.

19. The control method of claim 18, wherein the first threshold voltage is a sum of the reference voltage and a settle value voltage, and the second threshold voltage is a difference between the reference voltage and the settle value voltage.

20. The control method of claim 16, further comprising:
receiving a slew rate command from the processor;
when a first slew rate command is received together the VID code, reducing the reference voltage step by step until the reference voltage reaches the target value corresponding to the VID code; and
when a second slew rate command is received together with the VID code, changing the reference voltage into the target value in a controlled rate.

* * * * *